United States Patent
Mosko

(10) Patent No.: US 10,445,380 B2
(45) Date of Patent: *Oct. 15, 2019

(54) SYSTEM AND METHOD FOR DIRECT STORAGE ACCESS IN A CONTENT-CENTRIC NETWORK

(71) Applicant: Cisco Technology, Inc., San Jose, CA (US)

(72) Inventor: Marc E. Mosko, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

This patent is subject to a terminal disclaimer.

(21) Appl. No.: 15/710,984

(22) Filed: Sep. 21, 2017

(65) Prior Publication Data

US 2018/0011936 A1 Jan. 11, 2018

Related U.S. Application Data

(63) Continuation of application No. 14/196,498, filed on Mar. 4, 2014, now Pat. No. 9,836,540.

(51) Int. Cl.
*G06F 15/167* (2006.01)
*G06F 16/951* (2019.01)
(Continued)

(52) U.S. Cl.
CPC .......... *G06F 16/951* (2019.01); *H04L 45/742* (2013.01); *H04L 67/1097* (2013.01); *H04L 67/2842* (2013.01); *H04L 45/748* (2013.01)

(58) Field of Classification Search
CPC .. G06F 16/951; H04L 45/742; H04L 67/1097
(Continued)

(56) References Cited

U.S. PATENT DOCUMENTS

| 817,441 A | 4/1906 | Niesz |
|---|---|---|
| 4,309,569 A | 1/1982 | Merkle |

(Continued)

FOREIGN PATENT DOCUMENTS

| CN | 103873371 | 6/2014 |
|---|---|---|
| DE | 1720277 A1 | 6/1967 |

(Continued)

OTHER PUBLICATIONS

English translation of Office Action in corresponding Chinese Application No. 201510087410.9, dated Nov. 26, 2018, 9 pages.
(Continued)

*Primary Examiner* — Atta Khan
(74) *Attorney, Agent, or Firm* — Edell, Shapiro & Finnan, LLC

(57) ABSTRACT

One embodiment of the present invention provides a system for caching content data to a storage device attached to a node in a content-centric network (CCN). During operation, the system receives a content packet; forwards the content packet to an incoming port of an interest in the content packet; caches a copy of the content packet in the attached storage device, assembles a query; which includes at least a network header and an address associated with storage blocks at which the cached copy of the content packet is located, corresponding to the content packet; and stores the query in a cache table, thereby facilitating a subsequent direct access to the storage blocks using the assembled query to retrieve the copy of the content packet.

20 Claims, 7 Drawing Sheets

(51) Int. Cl.
  *H04L 12/747* (2013.01)
  *H04L 29/08* (2006.01)
  *H04L 12/745* (2013.01)

(58) Field of Classification Search
  USPC .................................................. 709/216
  See application file for complete search history.

(56) References Cited

U.S. PATENT DOCUMENTS

| | | | |
|---|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,267,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Fang |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garda-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |

(56) References Cited

U.S. PATENT DOCUMENTS

| | | | |
|---|---|---|---|
| 8,972,969 | B2 | 3/2015 | Gaither |
| 8,977,596 | B2 | 3/2015 | Montulli |
| 9,002,921 | B2 | 4/2015 | Westphal |
| 9,032,095 | B1 | 5/2015 | Traina |
| 9,071,498 | B2 | 6/2015 | Beser |
| 9,112,895 | B1 | 8/2015 | Lin |
| 9,137,152 | B2 | 9/2015 | Xie |
| 9,253,087 | B2 | 2/2016 | Zhang |
| 9,270,598 | B1 | 2/2016 | Oran |
| 9,280,610 | B2 | 3/2016 | Gruber |
| 2002/0002680 | A1 | 1/2002 | Carbajal |
| 2002/0010795 | A1 | 1/2002 | Brown |
| 2002/0038296 | A1 | 3/2002 | Margolus |
| 2002/0048269 | A1 | 4/2002 | Hong |
| 2002/0054593 | A1 | 5/2002 | Morohashi |
| 2002/0077988 | A1 | 6/2002 | Sasaki |
| 2002/0078066 | A1 | 6/2002 | Robinson |
| 2002/0138551 | A1 | 9/2002 | Erickson |
| 2002/0152305 | A1 | 10/2002 | Jackson |
| 2002/0176404 | A1 | 11/2002 | Girard |
| 2002/0188605 | A1 | 12/2002 | Adya |
| 2002/0199014 | A1 | 12/2002 | Yang |
| 2003/0004621 | A1 | 1/2003 | Bousquet |
| 2003/0009365 | A1 | 1/2003 | Tynan |
| 2003/0033394 | A1 | 2/2003 | Stine |
| 2003/0046396 | A1 | 3/2003 | Richter |
| 2003/0046421 | A1 | 3/2003 | Horvitz et al. |
| 2003/0046437 | A1 | 3/2003 | Eytchison |
| 2003/0048793 | A1 | 3/2003 | Pochon |
| 2003/0051100 | A1 | 3/2003 | Patel |
| 2003/0061384 | A1 | 3/2003 | Nakatani |
| 2003/0074472 | A1 | 4/2003 | Lucco |
| 2003/0088696 | A1 | 5/2003 | McCanne |
| 2003/0097447 | A1 | 5/2003 | Johnston |
| 2003/0099237 | A1 | 5/2003 | Mitra |
| 2003/0140257 | A1 | 7/2003 | Peterka |
| 2003/0229892 | A1 | 12/2003 | Sardera |
| 2004/0024879 | A1 | 2/2004 | Dingman |
| 2004/0030602 | A1 | 2/2004 | Rosenquist |
| 2004/0064737 | A1 | 4/2004 | Milliken |
| 2004/0071140 | A1 | 4/2004 | Jason |
| 2004/0073617 | A1 | 4/2004 | Milliken |
| 2004/0073715 | A1 | 4/2004 | Folkes |
| 2004/0090919 | A1* | 5/2004 | Callon ............... H04L 12/4633 370/237 |
| 2004/0139230 | A1 | 7/2004 | Kim |
| 2004/0196783 | A1 | 10/2004 | Shinomiya |
| 2004/0218548 | A1 | 11/2004 | Kennedy |
| 2004/0221047 | A1 | 11/2004 | Grover |
| 2004/0225627 | A1 | 11/2004 | Botros |
| 2004/0233916 | A1 | 11/2004 | Takeuchi |
| 2004/0246902 | A1 | 12/2004 | Weinstein |
| 2004/0252683 | A1 | 12/2004 | Kennedy |
| 2004/0267902 | A1* | 12/2004 | Yang ..................... H04L 69/16 709/217 |
| 2005/0003832 | A1 | 1/2005 | Osafune |
| 2005/0028156 | A1 | 2/2005 | Hammond |
| 2005/0043060 | A1 | 2/2005 | Brandenberg |
| 2005/0050211 | A1 | 3/2005 | Kaul |
| 2005/0074001 | A1 | 4/2005 | Mattes |
| 2005/0132207 | A1 | 6/2005 | Mourad |
| 2005/0149508 | A1 | 7/2005 | Deshpande |
| 2005/0159823 | A1 | 7/2005 | Hayes |
| 2005/0198351 | A1 | 9/2005 | Nog |
| 2005/0249196 | A1 | 11/2005 | Ansari |
| 2005/0259637 | A1 | 11/2005 | Chu |
| 2005/0262217 | A1 | 11/2005 | Nonaka |
| 2005/0281288 | A1 | 12/2005 | Banerjee |
| 2005/0286535 | A1 | 12/2005 | Shrum |
| 2005/0289222 | A1 | 12/2005 | Sahim |
| 2006/0010249 | A1 | 1/2006 | Sabesan |
| 2006/0029102 | A1 | 2/2006 | Abe |
| 2006/0039379 | A1 | 2/2006 | Abe |
| 2006/0051055 | A1 | 3/2006 | Ohkawa |
| 2006/0072523 | A1 | 4/2006 | Richardson |
| 2006/0099973 | A1 | 5/2006 | Nair |
| 2006/0129514 | A1 | 6/2006 | Watanabe |
| 2006/0133343 | A1 | 6/2006 | Huang |
| 2006/0146686 | A1 | 7/2006 | Kim |
| 2006/0173831 | A1 | 8/2006 | Basso |
| 2006/0193295 | A1 | 8/2006 | White |
| 2006/0203804 | A1 | 9/2006 | Whitmore |
| 2006/0206445 | A1 | 9/2006 | Andreoll |
| 2006/0215684 | A1 | 9/2006 | Capone |
| 2006/0223504 | A1 | 10/2006 | Ishak |
| 2006/0242155 | A1 | 10/2006 | Moore |
| 2006/0256767 | A1 | 11/2006 | Suzuki |
| 2006/0268792 | A1 | 11/2006 | Belcea |
| 2006/0288237 | A1* | 12/2006 | Goodwill ............... G06F 3/0611 713/193 |
| 2007/0019619 | A1 | 1/2007 | Foster |
| 2007/0073888 | A1 | 3/2007 | Madhok |
| 2007/0094265 | A1 | 4/2007 | Korkus |
| 2007/0112880 | A1 | 5/2007 | Yang |
| 2007/0124412 | A1 | 5/2007 | Narayanaswami |
| 2007/0127457 | A1 | 6/2007 | Mirtorabi |
| 2007/0160062 | A1 | 7/2007 | Morishita |
| 2007/0162394 | A1 | 7/2007 | Zager |
| 2007/0171828 | A1 | 7/2007 | Dalal |
| 2007/0189284 | A1 | 8/2007 | Kecskemeti |
| 2007/0195765 | A1 | 8/2007 | Heissenbuttel |
| 2007/0204011 | A1 | 8/2007 | Shaver |
| 2007/0209067 | A1 | 9/2007 | Fogel |
| 2007/0239892 | A1 | 10/2007 | Ott |
| 2007/0240207 | A1 | 10/2007 | Belakhdar |
| 2007/0245034 | A1 | 10/2007 | Retana |
| 2007/0253418 | A1 | 11/2007 | Shiri |
| 2007/0255677 | A1 | 11/2007 | Alexander |
| 2007/0255699 | A1 | 11/2007 | Sreenivas |
| 2007/0255781 | A1 | 11/2007 | Li |
| 2007/0274504 | A1 | 11/2007 | Maes |
| 2007/0275701 | A1 | 11/2007 | Jonker |
| 2007/0276907 | A1 | 11/2007 | Maes |
| 2007/0283158 | A1 | 12/2007 | Danseglio |
| 2007/0294187 | A1 | 12/2007 | Scherrer |
| 2008/0005056 | A1 | 1/2008 | Stelzig |
| 2008/0005223 | A1 | 1/2008 | Flake |
| 2008/0010366 | A1 | 1/2008 | Duggan |
| 2008/0037420 | A1 | 2/2008 | Tang |
| 2008/0043989 | A1 | 2/2008 | Furutono |
| 2008/0046340 | A1 | 2/2008 | Brown |
| 2008/0059631 | A1 | 3/2008 | Bergstrom |
| 2008/0080440 | A1 | 4/2008 | Yarvis |
| 2008/0082662 | A1 | 4/2008 | Dandliker |
| 2008/0095159 | A1 | 4/2008 | Suzuki |
| 2008/0101357 | A1 | 5/2008 | Iovanna |
| 2008/0107034 | A1 | 5/2008 | Jetcheva |
| 2008/0107259 | A1 | 5/2008 | Satou |
| 2008/0123862 | A1 | 5/2008 | Rowley |
| 2008/0133583 | A1 | 6/2008 | Artan |
| 2008/0133755 | A1 | 6/2008 | Pollack |
| 2008/0151755 | A1 | 6/2008 | Nishioka |
| 2008/0159271 | A1 | 7/2008 | Kutt |
| 2008/0165775 | A1 | 7/2008 | Das |
| 2008/0186901 | A1 | 8/2008 | Itagaki |
| 2008/0200153 | A1 | 8/2008 | Fitzpatrick |
| 2008/0215669 | A1 | 9/2008 | Gaddy |
| 2008/0216086 | A1 | 9/2008 | Tanaka |
| 2008/0243992 | A1 | 10/2008 | Jardetzky |
| 2008/0250006 | A1 | 10/2008 | Dettinger |
| 2008/0256138 | A1 | 10/2008 | Sim-Tang |
| 2008/0256359 | A1 | 10/2008 | Kahn |
| 2008/0270618 | A1 | 10/2008 | Rosenberg |
| 2008/0271143 | A1 | 10/2008 | Stephens |
| 2008/0287142 | A1 | 11/2008 | Keighran |
| 2008/0288580 | A1 | 11/2008 | Wang |
| 2008/0291923 | A1 | 11/2008 | Back |
| 2008/0298376 | A1 | 12/2008 | Takeda |
| 2008/0320148 | A1 | 12/2008 | Capuozzo |
| 2009/0006659 | A1 | 1/2009 | Collins |
| 2009/0013324 | A1 | 1/2009 | Gobara |
| 2009/0022154 | A1 | 1/2009 | Kiribe |
| 2009/0024641 | A1 | 1/2009 | Quigley |
| 2009/0030978 | A1 | 1/2009 | Johnson |

(56) References Cited

U.S. PATENT DOCUMENTS

| | | |
|---|---|---|
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1* | 8/2010 | Jacobson ............... H04L 45/00 370/392 |
| 2010/0195654 A1 | 8/2010 | Jacobson |
| 2010/0195655 A1* | 8/2010 | Jacobson ............... H04L 45/00 370/392 |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1* | 12/2010 | Petersen ............... H04L 45/00 370/392 |
| 2010/0322249 A1 | 12/2010 | Thathapudi |
| 2010/0332595 A1* | 12/2010 | Fullagar ............ H04N 7/17354 709/203 |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1* | 3/2012 | Turanyi ................ H04L 29/06 709/213 |
| 2012/0102136 A1* | 4/2012 | Srebrny ............ H04L 12/1886 709/213 |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |

(56) References Cited

U.S. PATENT DOCUMENTS

| | | |
|---|---|---|
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1* | 4/2013 | Arulambalam ......... H04L 65/60 709/213 |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1 | 10/2013 | Zhang |
| 2013/0282920 A1* | 10/2013 | Zhang ..................... H04L 45/74 709/238 |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1* | 9/2014 | Solis ..................... H04L 67/327 709/204 |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0254347 A1 | 9/2015 | Mosko |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |

FOREIGN PATENT DOCUMENTS

| | | |
|---|---|---|
| DE | 19620817 A1 | 11/1997 |
| EP | 0295727 A2 | 12/1988 |

(56) References Cited

FOREIGN PATENT DOCUMENTS

| | | | |
|---|---|---|---|
| EP | 0757065 | A2 | 7/1996 |
| EP | 10774224 | A2 | 2/2001 |
| EP | 1383265 | A1 | 1/2004 |
| EP | 1384729 | A1 | 1/2004 |
| EP | 1473889 | A2 | 11/2004 |
| EP | 2120402 | | 11/2009 |
| EP | 2120419 | | 11/2009 |
| EP | 2120419 | A2 | 11/2009 |
| EP | 2124415 | A2 | 11/2009 |
| EP | 2214357 | A1 | 8/2010 |
| EP | 2299754 | A1 | 3/2011 |
| EP | 2323346 | | 5/2011 |
| EP | 2552083 | | 1/2013 |
| EP | 2214356 | | 5/2016 |
| WO | 03005288 | A2 | 1/2003 |
| WO | 03042254 | A1 | 5/2003 |
| WO | 03049369 | A2 | 6/2003 |
| WO | 03091297 | A1 | 11/2003 |
| WO | 2007113180 | A1 | 10/2007 |
| WO | 2007022620 | | 11/2007 |
| WO | 2007144388 | A1 | 12/2007 |
| WO | 2011049890 | A1 | 4/2011 |
| WO | 2012077073 | A1 | 6/2012 |
| WO | 2013123410 | | 8/2013 |
| WO | 2015084327 | | 6/2015 |

OTHER PUBLICATIONS

Wetherall, David, "Active Network vision and reality: Lessons form a capsule-based system", ACM Symposium on Operating Systems Principles, Dec. 1, 1999, pp. 64-79.
Kulkarni A.B. et al., "Implementation of a prototype active network", IEEE, Open Architectures and Network Programming, Apr. 3, 1998, pp. 130-142.
J. Hur and D.K. Noh, "Atribute-based access control with efficient revocation in data outsourcing systers," IEEE Trans. Parallel Distrib. Syst, vol. 22, No. 7, pp. 1214-1221, Jul. 2011.
Ao-Jan Su, David R. Choffnes, Aleksandar Kuzmanovic, and Fabian E. Bustamante. Drafting Behind Akamani: Inferring Network Conditons Based on CDN Redirections. IEEE/ACM Transactions on Networking (Feb. 2009).
B. Lynn. The Pairing-Based Cryptography Library, http://crypto.stanford.edu/pbc/.
C. Gentry and A. Silverberg. Hierarchical ID-Based Cryptography. Advances in Cryptology—ASIACRYPT 2002. Springer Berlin Heidelberg (2002).
D. Boneh, C. Gentry, and B. Waters, 'Collusion resistant broadcast encryption with short cipertexts and private keys,' in Proc. CRYPTO 2005, Santa Barbara, CA, USA, Aug. 2005, pp 1-19.
D. Boneh and M. Franklin, Identity-Based Encryption from the Weil Pairing. Advances in Cryptology—CRYPTO 2001, vol. 2139, Springer Berlin Heidelberg (2001).
G. Ateniecse, K. Fu, M. Green, and S. Hohenberger. Improved Proxy Reencryption Schemes with Applications to Secure Distributed Storage. In the 12th Annual Network and Distributed System Securiy Symposium (2005).
H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).
J. Bethencourt, A, Sahai, and B. Waters, 'Ciphertext-policy attibute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digital Rights Management using Broadcast Encryption. Proceedings of the IEEE 92.6 (2004).
J. Shao and Z. Cao. CCA-Secure Proxy Re-Encryption without Pairings. Public Key Cryptography. Springer Lecture Notes in Computer Sciencevol. 5443 (2009).
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
R. H. Deng, J. Weng, S. Liu, and K. Chen. Chosen-Cipertext Secure Proxy Re-Encryption without Pairings. CANS. Spring Lecture Notes in Computer Science vol. 5339 (2008).
RTMP (2009). Available online at http://wwwimages.adobe.com/ www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Karnara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/documents/ Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009, ACM ReArch'09.
Rosenberg, J. "Interactive Connectivity Establishment (ICE): A Protocol for Network Address Tralator (NAT) Traversal for Offer/ Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid= 465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7.pursuit.ew/PursuitWeb/. downloaded Mar. 11, 2015.
"The FP7 4WARD project," http://www.4ward-project.eu/. downloaded Mar. 11, 2015.
A Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On ther scale and performance of cooperative web proxy caching." ACM SIGHOPS Operating Systems Review, vol. 33, No. 5, pp. 16-31, Dec. 1999.
Alanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.

(56) References Cited

OTHER PUBLICATIONS

Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Loboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, Alexander L. Wolf. 'A routing scheme for content-based networking.' INFOCOM 2004. Twenty-third Annual Joint Conference of the IEEE Computer and Communications Societies. vol. 2, IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet.project.org/, Downloaded Mar. 9, 2015.
D. K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st International conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Infromation Processing Letters 11.1 (1980): 1-4.
Dijkstra, Edsger, W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distrubuterd Computations," Information Processing Leeter, vol. 16, No. 5, 1983.
Fayazbakhsh, S. K.. Lin, Y., Tootoonchian. A., Ghodsi, A., Koponen, T., Maggs, B., & Shenker, S. (Aug. 2013)—Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of catching in content-centric networks," In Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Survey and Tutorials, Jul. 2013.
Garcia, Humberto, E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review, vol. 19, No. 4, ACM, 1989.
Garcia-Luna-Aceves, Jose J. 'Name-Based Content Routing in Information Centric Networks Using Distance Information', Proc ACM ICN 2014, Sep. 2014.
Ghail, Cesar, GeneTsudik, and Ersin Uzun. "Needle in a Haystack: Mitigating Content Poisoning in Named-Data Networking." Porceedings of NDSS Workshop on Security of Emerging Networking Technologies (SENT). 2014.
Ghodsi, Ali, et al. "Information-centric networking: seeing the forest for the tress." Proceedings of the 10th ACM Workshop on Hot Topics in Networks. ACM. 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI, vol. 4, 2004.
Heckerman, Daviid, John S. Breese, and Koos Rommeise. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 (2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
http://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attubute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson et al., "Custodian-Based Infromation Sharing," Jul. 2012, IEEE Communications Magazine: vol. 50 Issue 7 (p. 3843).
Ji, Kun,, et al. "Prognostics enabled resilient control for model-based building automation systems." Proceedings of the 12th Conference on International Building Performance Simuation Asscia-tion. 2011.
K. Liang, L. Fang, W. Susilo, and D.S. Wong, "A Cliphertext-policy attribute-based proxy re-encryption with chosen-cliphertext dsecurity," in Proc. INCoS 2013, Xian, China, Sep. 2013, pp. 552-559.
Katipamula, Srinivas, and Michael R. Brambley, "Review article: methods for fault detection, diagnostics, and prognostics for building systemsa review, Part I." HVAC&R Research 11.1 (2005): 3.25.
Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Riouting Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenija, Anupam, Joshi, and Tim Finin, "Coping with node misbehaviors in ad hoc networks: A multi-dimensional trust man-

(56) References Cited

OTHER PUBLICATIONS agement appoach." Mobile Data Management (MDM), 2010 Eleventh International Conference on. IEEE, 2010.
Lopez, Javier, et al, "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, Bristish West Indies, Feb. 2000, pp. 1-20.
M. Nystrom, S. Parkinson, A. Rusch, and M. Scott, "PKCS#12: Personal Information exchange syntax v. 1.1," IETF RFC 7292, K. Moriarty, Ed., Jul. 2014.
M. Parssa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Commnunication Review. vol. 37, No. 4, ACM, 2007.
Mahadevan, Priya, et al. "Systematic topology analysis and generation using degree correlations." ACM SIGCOMM Computer Communicaton Review, vol. 36, No. 4, ACM, 2006.
Matocha, Jeff, and Tracy Camp, 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybriid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E. Uzun, S Sevilla, and J. Garcia-Luna-Aceves,— CCN-krs: A key resolution service for ccn, in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture of wide-area multicast routing," IEEE/ACM Trans, on Networking, vol. 4, No. 2, Apr. 1996.
S. Jahid, P. Mittal, and N. Borisov, "EASIER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010 Tenerife, Canary Islands, Spain, Jan. 2010, pp. 136-149.
S. Kumar et al., "Peacock Hashing: Deterministic and Updatable Hashing for High Performance Networking," 2008, pp. 556-564.
S. Misra, R. Tourani, and N.E. Majd, "Secure content delivery in information-centric networks: Design, Implementation, and analysis," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce. [Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Genration Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Porc. ACM SIGCOMM '88. Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' inProc. ACM CoNEXT 2009, Rome, Italy, Dec. 2009, pp. 1-12.
Verma, Vandl, Joquin Fernandez, and Reid Simmons. "Probaslistic models for monitoring and fault diagnosis," The Second IARP and IEEE/RAS Joint Workshop on Technical Challenges for Dependable Robots in Human Environments, Ed. Rja Challa Oct. 2002.
Vutukury, Srinivas, and J. J. Garcia-Luna-Aceves. A simple approximation to minimum-delay routing. vol. 29, No. 4, ACM, 1999.
W.-G. Tzeng and Z.-J. Tzeng, "A public key traitor tracing scheme wiith revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Techbnology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al, "DMND: Collecting Data from Mobiles Using Named Data", Vehicular Networking Conference, 2010, IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al., 'Adaptive forwarding in named data networking.' ACM SIGCOMM computer communication review 42.3 (2012): 62-67.

(56) References Cited

OTHER PUBLICATIONS

Zahariadis, Theodore, et al., "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 (2014): 66-73.
Soh et al., "Efficient Prefix Updates for IP Router Using Lexicographic Ordering and Updateable Address Set", Jan. 2008, IEEE Tranaactions on Computers, vol. 57, No. 1.
Beben et al., "Content Aware Network based on Virtual Infrastrcture", 2012 13th ACIS International Conference on Software Engineering.
Biradar et al., "Rewiew of multicast routing mechanisms in mobile ad hoc networks", Aug. 16. Journal of Networks.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov 5, 2012, IEEE Information and Telecommunication Technologies (APSITT), 2012 9th Asia Pacific Symposium.
J. Hur and D.K. Noh, "Attubute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hasing Network Applications", 2006 IEEE Computer Society Annual Symposium on Emerging VLSI Technologies and Architectures, Mar. 2006.
Xie et al. "Collaborative Forwarding and Caching in Content Centric Networks", Networking 2012.
Lui et al. (A TLV-Structured Data Naming Scheme for Content-Oriented Networking, pp. 5822-5827. International Workshop on the Network of the Future, Communications (ICCC), 2012 IEEE International Conference on Jun. 10-15, 2012).
Peter Dely et al. "OpenFlow for Woreless Mesh Networks" Computer Communicatons and Networks, 2011 Proceedings of 20th International Conference on, IEEE Jul. 31, 2011 (Jul. 31, 2011), pp. 1-6.
Garmepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-6.
Tiancheng Zhaung et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko. "CCNx 1.0 Protocol Introduction" Apr. 2, 2014 [Retrieved from the Internet Jun. 8, 2016]http://www.ccnx.org/pubs/hhg/1.1%20CCNx%201.0%20Protocol%20Introduction.pdf paragraphs [01,3], [002], [02.1], [003].
Akahs Baid et al. "Comparing alernative approaches for networking of named objects in the future Internet", Computer Communications Workshop (Infocom Wkshps), 2012 IEEE Conference on, IEEE, Mar. 25, 2012, pp. 298-303. * Paragraph [002]* * figure I*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016]* paragraphs [003]—[006], [0011], [0013]*.
Marc Mosko et al "All-In-One Steams for Content Centric Networks", May 24, 2015, retrieved form the Internet: http://www.ccnx.org/pubs/AllinOne.pdf [downloaded Jun. 9, 2016]*the whole document*.
Cesar Ghail et al. "Elements of Trust in Named-Data Networking", Feb. 13, 2014 Retrieved from the Internet Jun. 17, 2016 http://axiv.org/pdf/1402.3332v5.pdf *p. 5, col. 1* *p. 2, col. 1-2* * Section 4.1; p. 4, col. 2* * Section 4.2: p. 4, col. 2*.
Priya Mahadevan et al. "CCN-KRS", Proceedings of the 1st International Conference on Information-Centric Networking, Inc. '14, Sep. 24, 2014.
Flavio Roberto Santos et al. "Funnel: Choking Pojjuters in BitTorrent File Sharing Communitits", IEEE Transactions on Network and Service Management, IEEE vol. 8 No. 4, Dec. 1, 2011.
Liu Wai-Xi et al; "Multisource Disseminatioon in content-centric networking", 2013 Fourth International conference on the network of the future (NOF), IEEE, Oct. 23, 2013, pp. 1-5
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 * The Whole Document*.
Sun et al.: "Content-Based Route Lookup Using CAMs", Global Communications Conference, IEEE, Dec. 3, 2012 * The Whole Document*.

* cited by examiner

SYSTEM AND METHOD FOR DIRECT STORAGE ACCESS IN A CONTENT-CENTRIC NETWORK

CROSS-REFERENCE TO RELATED APPLICATIONS

This application is a continuation of U.S. patent application Ser. No. 14/196,498, filed Mar. 4, 2014, the entirety of which is incorporated herein by reference. The subject matter of this application is related to the subject matter in the following applications:

U.S. patent application Ser. No. 14/065,961, entitled "SYSTEM AND METHOD FOR HASH-BASED FORWARDING OF PACKETS WITH HIERARCHICALLY STRUCTURED VARIABLE-LENGTH IDENTIFIERS," by inventors Marc E. Mosko and Michael F. Plass, filed 29 Oct. 2013;

U.S. patent application Ser. No. 14/067,857, entitled "SYSTEM AND METHOD FOR MINIMUM PATH MTU DISCOVERY IN CONTENT CENTRIC NETWORKS," by inventor Marc E. Mosko, filed 30 Oct. 2013; and U.S. patent application Ser. No. 14/069,286, entitled "HASH-BASED FORWARDING OF PACKETS WITH HIERARCHICALLY STRUCTURED VARIABLE-LENGTH IDENTIFIERS OVER ETHERNET," by inventors Marc E. Mosko, Ramesh C. Ayyagari, and Subbiah Kandasamy, filed 31 Oct. 2013;

the disclosures of which herein are incorporated by reference in their entirety.

BACKGROUND

Field

The present disclosure relates generally to facilitating storage access within a data network. More specifically, the present disclosure relates to a system and method for facilitating direct storage access in a content-centric network (CCN).

Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on location-based addresses. That is, a consumer of content can only receive the content by explicitly requesting the content from an address (e.g., IP address or Ethernet media access control (MAC) address) closely associated with a physical object or location. This restrictive addressing scheme is becoming progressively more inadequate for meeting the ever-changing network demands.

Recently, content-centric network (CCN) architectures have been proposed in the industry. CCN brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

In CCN, content objects and interests are identified by their names, which is typically a hierarchically structured variable-length identifier (HSVLI). When an interest in a piece of content is received at a CCN node, a local content cache is checked to see if the content being requested exists. In addition, the CCN node may selectively cache popular content objects to increase the network response rate. In order to cache large amount of content, a CCN router or switch may couple to storage devices, which may be organized as a direct-attached storage (DAS) system, a network-attached storage (NAS) system, and or a storage area network (SAN) system.

SUMMARY

One embodiment of the present invention provides a system for caching content data to a storage device attached to a node in a content-centric network (CCN). During operation, the system receives a content packet; forwards the content packet to an incoming port of an interest in the content packet; caches a copy of the content packet in the attached storage device, assembles a query; which includes at least a network header and an address associated with storage blocks at which the cached copy of the content packet is located, corresponding to the content packet; and stores the query in a cache table, thereby facilitating a subsequent direct access to the storage blocks using the assembled query to retrieve the copy of the content packet.

In a variation on this embodiment, the attached storage device includes at least one of: an advanced technology attachment (ATA) over Ethernet storage array, a Fibre Channel over Ethernet (FCoE) storage array, and an Internet Small Computer System Interface (iSCSI) storage array.

In a further variation, the network header includes an Ethernet header.

In a variation on this embodiment, the content packet includes a plurality of fragments. The system caches a copy of the content packet by storing each fragment into a separate set of contiguous storage blocks, and assemble a separate query for each fragment. An entry in the cache table corresponding to the content packet includes a plurality of queries corresponding to the plurality of fragments.

In a variation on this embodiment, the system subsequently receives an interest in the content packet; searches the cache table to obtain the query; sends the query to the attached storage device; receives, from the attached storage device, a data packet in response to the query; removes a network header from the received data packet; and forwards the data packet.

In a further variation, searching the cache table involves performing a longest-prefix-match lookup based on the received interest.

In a further variation, the system further constructs a network representation of the query based on elements stored in the cache table.

In a variation on this embodiment, the address associated with the storage blocks includes a logical block addressing (LBA) address.

In a variation on this embodiment, the node includes multiple line cards each capable of receiving content and interest packets. The system further populates the cache table to all of the multiple line cards.

BRIEF DESCRIPTION OF THE FIGURES

In the figures, like reference numerals refer to the same figure elements.

DETAILED DESCRIPTION

Overview

Figure 1:
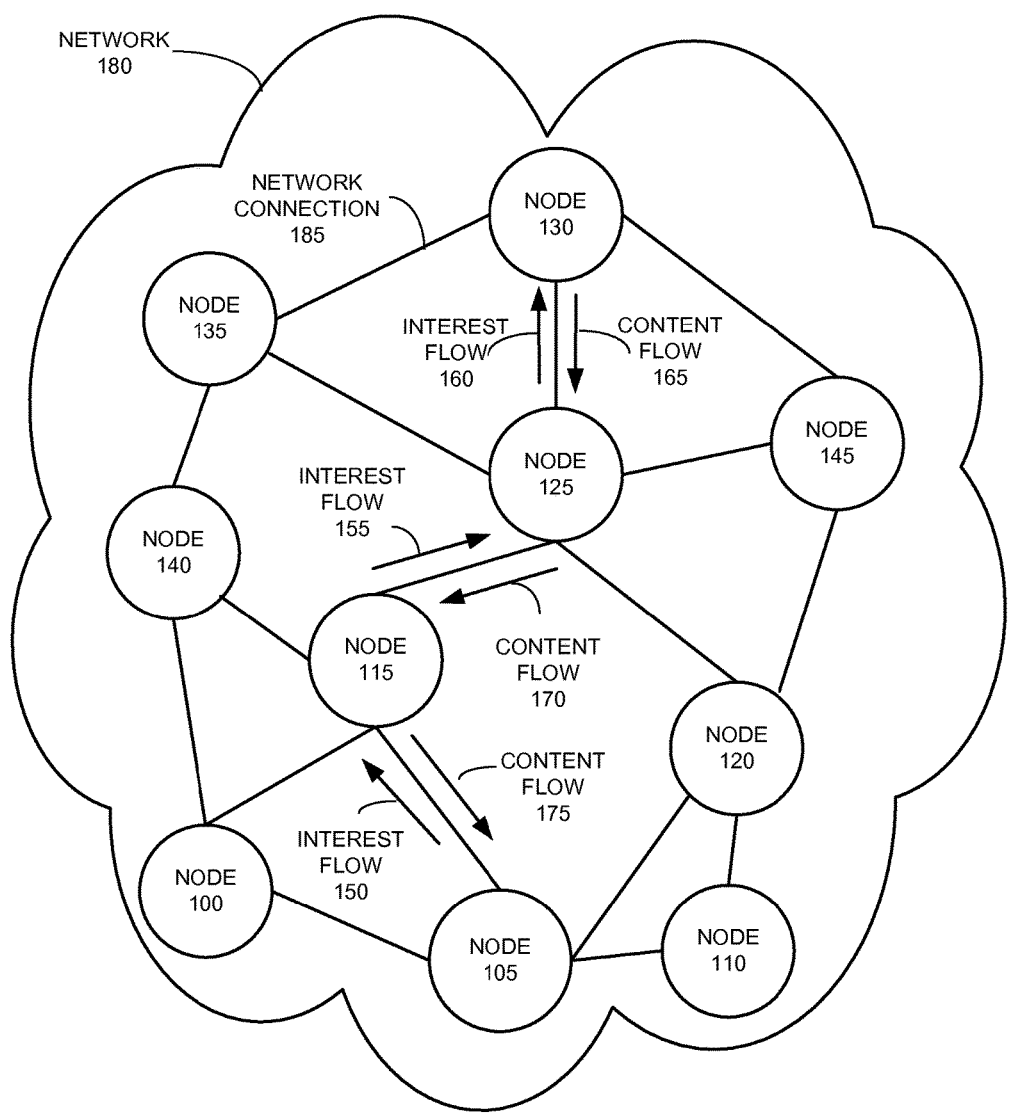
FIG. 1 illustrates an exemplary architecture of a network, in accordance with an embodiment of the present invention.

Embodiments of the present invention provide a system and method for quick, efficient access to a storage that is attached to a CCN-enabled switch or router. During operation, when a CCN-enabled switch or router receives a content object or fragments of the content object, the switch determines that the content object should be cached, and sends a copy of the content object (or its fragments) to a content store manager. The content store manager reassembles the fragments (when needed), and writes the copy of the content object into the attached storage. More specifically, before writing into the attached storage, the content store manager may also fragment the content object to suitable size for transportation. Each transported fragment is written into a contiguous set of blocks in the attached storage, and the content store manager adds transport and fragment headers to each contiguous set of blocks. In addition, the content store manager generates and populates a cache table indexed by the name prefix of the content object. An entry in the cache table specifies locations of the sets of storage blocks at which fragments of the content object are located. In some embodiments, a cache entry includes a set of pre-assembled data communication frames with each frame dedicated to a fragment. A pre-assembled frame may include appropriate transport headers and a pointer to the storage blocks, and can be used to retrieve the corresponding fragment from the attached storage.

In general, CCN uses two types of messages: Interests and Content Objects. An Interest carries the hierarchically structured variable-length identifier (HSVLI), also called the "name," of a Content Object and serves as a request for that object. If a network element (e.g., router) receives multiple interests for the same name, it may aggregate those interests. A network element along the path of the Interest with a matching Content Object may cache and return that object, satisfying the Interest. The Content Object follows the reverse path of the Interest to the origin(s) of the Interest. A Content Object contains, among other information, the same HSVLI, the object's payload, and cryptographic information used to bind the HSVLI to the payload.

The terms used in the present disclosure are generally defined as follows (but their interpretation is not limited to such):

"HSVLI:" Hierarchically structured variable-length identifier, also called a Name. It is an ordered list of Name Components, which may be variable length octet strings. In human-readable form, it can be represented in a format such as ccnx:/path/part. There is not a host or query string. As mentioned above, HSVLIs refer to content, and it is desirable that they be able to represent organizational structures for content and be at least partially meaningful to humans. An individual component of an HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an interest in "/parc/home/bob" will match both "/parc/home/bob/test.txt" and "/parc/home/bob/bar.txt." The longest match, in terms of the number of name components, is considered the best because it is the most specific.

"Interest:" A request for a Content Object. The Interest specifies an HSVLI name prefix and other optional selectors that can be used to choose among multiple objects with the same name prefix. Any Content Object whose name matches the Interest name prefix and selectors satisfies the Interest.

"Content Object:" A data object sent in response to an Interest. It has an HSVLI name and a Contents payload that are bound together via a cryptographic signature. Optionally, all Content Objects have an implicit terminal name component made up of the SHA-256 digest of the Content Object. In one embodiment, the implicit digest is not transferred on the wire, but is computed at each hop, if needed.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s), i.e., the "news" article from the "ccn" collection of papers for a user named "Bob" at the organization named "ABCD." To request a piece of content, a node expresses (e.g., broadcasts) an interest in that content by the content's name. An interest in a piece of content can be a query for the content according to the content's name or identifier. The content, if available in the network, is routed back to it from any node that stores the content. The routing infrastructure intelligently propagates the interest to the prospective nodes that are likely to have the information and then carries available content back along the path which the interest traversed.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate interest or originate content.

In accordance with an embodiment of the present invention, a consumer can generate an Interest in a piece of content and then send that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (interest flow 150) to node 115, which does not have the content available. Next, the Interest flows (interest flow 155) from node 115 to node 125, which again does not have the content. The Interest then flows (interest flow 160) to node 130, which does have the content available. The flow of the content then retraces its path in reverse (content flows 165, 170, and 175) until it reaches node 105, where the content is delivered. Other processes such as authentication can be involved in the flow of content.

In network 180, any number of intermediate nodes (nodes 100145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

CCN-Enabled Switch with Attached Storage

As described previously, in CCN, it is desirable to have intermediate nodes caching local copies of the content. This requires the intermediate nodes to have a large storage capacity because the amount of content flow through the network can be huge. For example, a storage device with a large-capacity, such as a capacity of many terra-bytes, would be needed to maintain a video cache. Such a large-capacity storage is usually implemented in the form of attached storage, such as network-attached storage (NAS).

Figure 2:
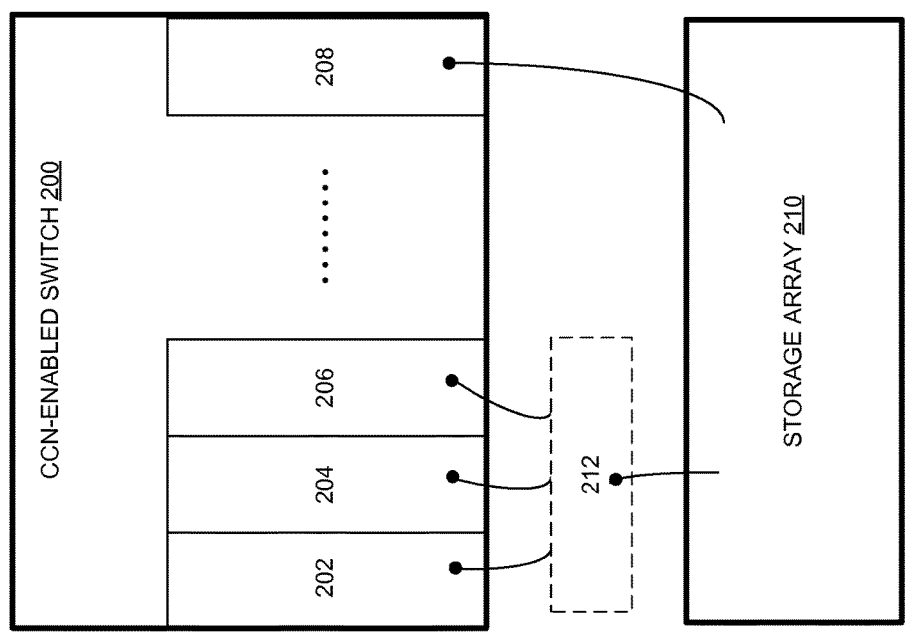
FIG. 2 presents a diagram illustrating an exemplary content-centric network (CCN)-enabled switch with attached storage, in accordance with an embodiment of the present invention.

FIG. 2 presents a diagram illustrating an exemplary content-centric network (CCN)-enabled switch with attached storage, in accordance with an embodiment of the present invention. In FIG. 2, CCN-enabled switch 200 includes a number of line cards, such as line cards 202, 204, and 206; and a supervisor card 208. In FIG. 2, CCN-enabled switch 200 is coupled to an attached storage array 210. Attached storage array 210 can include various types of disk arrays, which can be a network attached storage (NAS) array, a storage area network (SAN) array, or a virtualized storage array. In some embodiments, each line card (such as line card 202, 204, or 206) in CCN-enabled switch 200 is coupled to attached storage array 210 via a high-speed switch 212. In some embodiments, supervisor card 208 is coupled to, and has direct access to storage array 210, and the line cards are configured to access storage array 210 via supervisor card 208.

To facilitate efficient content retrieval, attached storage array 210 can operate at high speed. In some embodiments, attached storage array 210 includes a high-speed interface, such as a 10 Gigabit Ethernet (10GE) interface, for interfacing with CCN-enabled switch 200. In addition, depending on the types of storage arrays, such as advanced technology attachment (ATA) storage arrays or fibre channel (FC) storage arrays, the communication between storage array 210 and CCN-enabled switch 200 can use different network protocols, such as ATA over Ethernet (AoE), Fibre Channel (FC), or Fibre Channel over Ethernet (FCoE). In addition, other IP-based protocols, such as iSCSI (Internet Small Computer System Interface), can also be used to enable communication between an IP-based attached storage with CCN-enabled switch 200.

Figure 3:
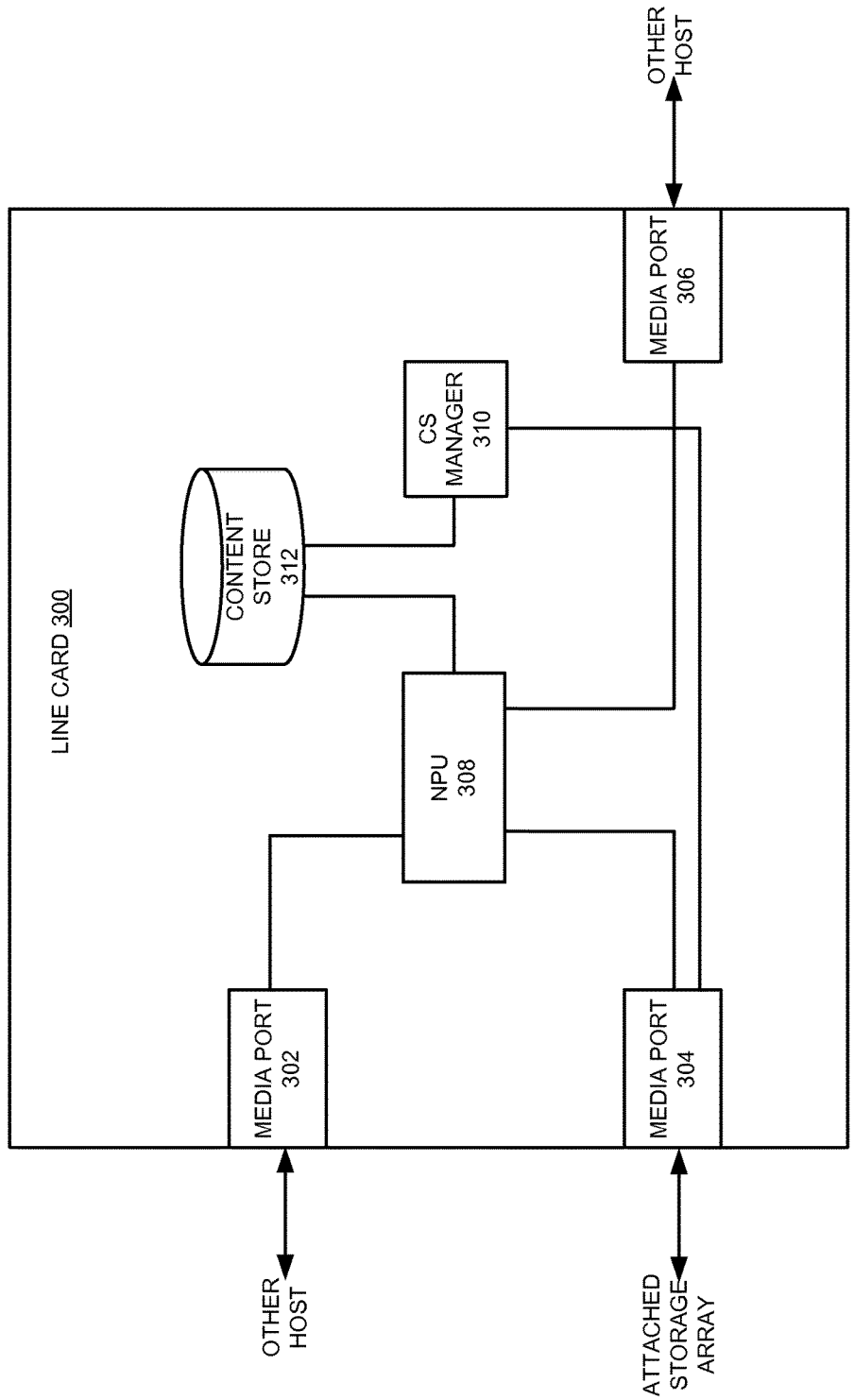
FIG. 3 presents a diagram illustrating an exemplary line card in a CCN-enabled switch, in accordance with an embodiment of the present invention.

FIG. 3 presents a diagram illustrating an exemplary line card in a CCN-enabled switch, in accordance with an embodiment of the present invention. In FIG. 3, line card 300 includes a number of media ports, such as media ports 302, 304, and 306; a network-processing unit (NPU) 308, a content store (CS) manager 310, and a content store 312.

During operation, media ports 302-306 are responsible for interfacing with external devices, such as other hosts or an attached storage array. For example, media ports 302 and 306 are coupled to other hosts and are responsible for sending/receiving Interest or Content Object to/from the other hosts, and media port 304 is coupled to an attached storage array and is responsible for caching/retrieving Content Objects to/from the attached storage array.

NPU 308 has a limited computation capability, and is responsible for processing the incoming/outgoing packets at line speed, i.e., at the same speed the packets being received. In some embodiments, NPU 308 is responsible for examining a receiving Interest packet and performs prefix match lookup in various data structures, such as content store 312, a pending interest table (PIT), and a forwarding information base (FIB). Note that the PIT and the FIB are not shown in FIG. 3. In some embodiments, the PIT, the FIB, and content store 312 can be implemented using random-access memories (RAMs), which can be a dynamic RAM (DRAM) or a static RAM (SRAM).

Content Store (CS) 312 is similar to the buffer memory used in an IP router. In conventional CCNs, a CS may temporarily buffers Content Objects that pass through this switch. However, such an approach means that the size of the CS will determine the amount of content data that can be cached by the switch. In contrast, in some embodiments of the present invention, instead of keeping the content data, CS 312 only maintains a cache table that can be used for retrieval of Content Objects stored in the attached storage array. Details about the cache table will be described later.

The PIT keeps track of Interests forwarded upstream toward content source(s) so that returned Content Object can be sent downstream to its requester(s). In CCN, only Interest packets are routed. The returning Content Object follows the trail of the Interest packet back to the content requester. A PIT entry for an Interest specifies the name of the Interest and one or multiple incoming and outgoing ports for that Interest. Multiple ports listed in the PIT entry indicate that the same content has been requested by multiple downstream users, and multiple outgoing ports indicate that the same Interest is forwarded along multiple paths.

The FIB is used to forward Interest packets toward potential source or sources of matching Content Objects. Typically, a routing protocol is used to populate the FIB among all nodes in the network. The FIB entries are often indexed by the name prefixes.

When an Interest packet arrives on a media port 302 from a remote host, NPU 308 performs one or more longest-match lookups based on the Interest name, or the HSVLI. In some embodiments, hash-based forwarding is used, where each node uses the same hash function to encode name prefixes and performs longest-match lookup using the fixed-length hash. Detailed descriptions of the hash forwarding can be found in U.S. patent application Ser. No. 14/065,961, entitled "SYSTEM AND METHOD FOR HASH-BASED FORWARDING OF PACKETS WITH HIERARCHICALLY STRUCTURED VARIABLE-LENGTH IDENTIFIERS," by inventors Marc E. Mosko and Michael F. Plass, filed 29 Oct. 2013, the disclosure of which herein is incorporated by reference in its entirety.

In some embodiments, the index structure used for the name lookup is ordered in a way such that a CS match will be preferred over a PIT match, which will be preferred over an FIB match. Hence, if there is already a matching entry found in CS 312, the Content Object will be retrieved and sent out the port the Interest arrived on (such as media port 302) and the Interest will be discarded. Otherwise, NPU 308 checks the PIT to see if a matching entry can be found. If so, the Interest's arrival port will be added to the PIT entry's requesting port list and the Interest will be discarded. Otherwise, the FIB will be checked. Note that for system relying on hash forwarding, the FIB entries may be indexed based on the forwarding hashes, and checking the FIB involves finding a longest matching prefix in the FIB. If there is a match in the FIB, then the Interest needs to be forwarded to the ports listed in the FIB entry. For example, the FIB may list media port 306 as the outgoing port for the received Interest, and consequently, NPU 308 forwards the Interest to a corresponding host via media port 306.

When the requested Content Object is returned, it arrives at line card 300 on media port 306. For a Content Object of large size, fragments of the Content Object will be received at media port 306. Subsequently, NPU 308 processes the Content Object (or fragments of the Content Object) by matching its name, such as the HSVLI or its hash, in the PIT. Note that NPU 308 may drop the Content Object if no matching entry is found in the PIT. In addition, NPU 308 may also determine whether the Content Object arrives from a port over which a corresponding Interest (based on the matching entry in the PIT) was previously forwarded, or over which the corresponding Interest could have been forwarded. If this condition is not met, NPU 308 drops the Content Object. The ingress port in the matching PIT entry is used to forward the Content Object (or its fragments), thus ensuring that the Content Object is reverse-path forwarded back to the host sending the Interest. In addition to forwarding the Content Object, NPU 308 determines whether to cache the Content Object. In some embodiments, NPU 308 caches every Content Object passing through. In some embodiments, NPU 308 may determine whether to cache a Content Object based on its popularity or importance, and caches Content Objects having a popularity/importance level exceeding a certain threshold (such as the number of requesters exceeding a threshold number).

Once NPU 308 determines to cache a Content Object, it sends a copy of the Content Object to CS manager 310. In some embodiments, NPU 308 may multicast the Content Object to the outgoing port (media port 306) and CS manager 310. CS manager 310 can be a process running on a central processing unit (CPU), which can be located on line card 300 or on the supervisor card. In some embodiments, CS manger 310 may be implemented using hardware. CS manager 310 processes the Content Object as needed and sends the processed Content Object to the attached storage array via media port 304.

Depending on the size of the Content Object and the type of storage array, CS manager 310 may perform different operations on the Content Object. For example, the received Content Object may be fragmented by one or more of the previous links in order to meet the maximum transmission unit (MTU) requirements of those links. Detailed description of the fragmentation of Content Objects in CCNs can be found in U.S. patent application Ser. No. 14/067,857, entitled "SYSTEM AND METHOD FOR MINIMUM PATH MTU DISCOVERY IN CONTENT CENTRIC NETWORKS," by inventor Marc E. Mosko, filed 30 Oct. 2013, the disclosure of which herein is incorporated by reference in its entirety. In some embodiments, upon receiving the fragments of a Content Object, CS manager 310 may reassemble the original Content Object based on the fragment headers.

In addition to reassembling a fragmented Content Object, in some embodiments, CS manager 310 also performs packet fragmentation. This time, the purpose of the fragmentation is to ensure that each fragment is in a suitable size for subsequent network transportation, more particularly, satisfying the MTU requirement imposed by the network transport protocol in possible subsequent links. Depending on the protocol used and the underlying physical transmission medium, different network links may impose different MTUs. For example, IPv6 requires that all of its data links support a minimum MTU of 1280 bytes. Ethernet data links typically have an MTU of 1500 bytes.

If the transport protocol for a network link requires an MTU of 1280 bytes, the Content Object may need to be divided to a plurality of fragments of 1200 bytes each. CS manager 310 then writes each fragment, along with the transport and fragment headers, to a set of contiguous blocks in the attached storage array. For example, if the attached storage array includes ATA drives, three contiguous ATA blocks are needed to cache a fragment that is transported over the 1280-byte MTU link. Note that the blocks include the fragment of the Content Object and the transport and fragment headers. The contiguous set of blocks should also fit within the local attachment size. If the communication protocol on the link between line card 300 and the attached storage array is AoE or FCoE, meaning the contiguous set of blocks should fit within the Ethernet frame size of 1500 bytes or the jumbo Ethernet frame size of 9000 bytes.

In addition to caching the fragments of the Content Object into the attached storage array, CS manager 310 is also responsible for generating and populating (among all line cards within the switch node) a cache table. The cache table can be stored in CS 312, and are indexed by Interest or CCN names. A respective entry in the cache table matches an Interest in a corresponding Content Object. More specifically, the entry specifies the sets of storage blocks at which fragments of the Content Object are cached. In some embodiments, CS manager 310 can pre-assemble a set of queries that can later be used for retrieval of the sets of storage blocks. By pre-assembling the set of queries, CS manager 310 eliminates the need of query computation at the time when the Content Object is requested, thus making it possible for NPU 308 (which often has a much limited computation capability than that of a CPU, and in general does not include a file system) to process a subsequently arrived Interest and retrieve the Content Object at line speed.

In some embodiments, instead of the pre-assembled queries, CS 312 stores a compressed table that includes an index to the storage array's network address, a flag to indicate the type of encapsulation to construct, and the disk addresses to retrieve. When subsequent Interest in the Content Object arrives, NPU 308 constructs the appropriate network frame or frames. This approach saves storage space in CS 312 but requires additional NPU processing cycles.

Figure 4:
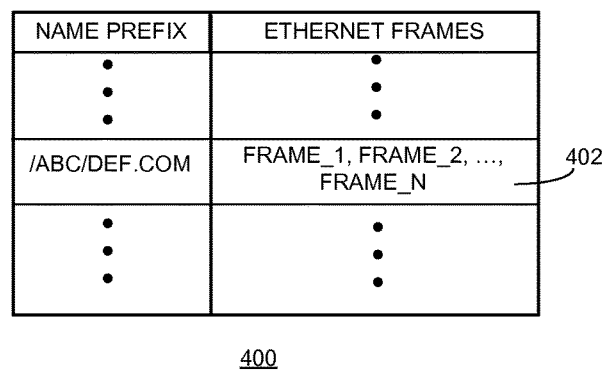
FIG. 4 presents a diagram illustrating an exemplary cache table stored in the content store, in accordance with an embodiment of the present invention.

In some embodiments, the network protocol used by the link between line card 300 and the attached storage array is AoE or FCoE, meaning that the pre-assembled queries are pre-assembled Ethernet frames that includes Ethernet headers as well as headers specific to the type of storage, such as ATA headers or FC headers. FIG. 4 presents a diagram illustrating an exemplary cache table stored in the content store, in accordance with an embodiment of the present invention. In FIG. 4, cache table 400 includes a plurality of name-indexed entries. Each entry, such as an entry 402, corresponds to a Content Object, and includes a name (such as /ABC/DEF.COM) and a set of Ethernet frames. The name can be the name of the Content Object, or the name of an Interest to which the Content Object is returned. For systems using hash-forwarding, the name can be the fixed-length hash function of the HSVLI of the Content Object or the corresponding Interest. Each Ethernet frame in the entry (such as FRAME_1 to FRAME_N) corresponds to a fragment of the Content Object. For example, if a Content Object is fragmented to three fragments when it is written into the attached storage array, the entry corresponding to the Content Object in cache table 400 will include three Ethernet frames, with each frame corresponding to a fragment.

Figure 5:
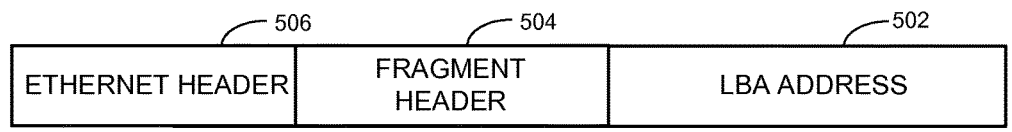
FIG. 5 presents an exemplary Ethernet frame stored in the cache table for direct storage access, in accordance with an embodiment of the present invention.

In some embodiments, a pre-assembled Ethernet frame in the cache table includes Ethernet wrappers, fragment headers, and a pointer to the storage blocks that stores the fragment. FIG. 5 presents an exemplary Ethernet frame stored in the cache table for direct storage access, in accordance with an embodiment of the present invention. In FIG. 5, Ethernet frame 500 includes a logical block addressing (LBA) address 502, a fragment header 504, and an Ethernet header 506.

LBA address 502 specifies the address of the set of contiguous storage blocks which stores the content fragment. Note that depending on the type of storage, certain specific command format may be used. For example, ATA read command may be used to encompass LBA address 502. Those specific formats or storage headers are not shown in FIG. 5. Fragment header 504 includes information associated with the fragmentation, such as the fragment stream ID identifying the Content Object, total number of fragments in the stream, and the fragment serial number identifying each fragment. Ethernet header 506 includes information needed for sending the frame to the correct destination, such as the media access control (MAC) address of the destination (which can be a physical attached storage device or a virtual storage).

When an Interest requesting the cached Content Object is received at a node, the cache table stored in the CS is checked to determine whether a matching entry can be found. In some embodiments, a longest-prefix-match lookup is performed. Once a matching entry is found, the node sends every Ethernet frame included in the matching entry to the attached storage device to retrieve all fragments of the Content Object. Note that, because the Ethernet frames have been pre-assembled, there is no need to perform any computation associated with assembly of communication frames suitable for retrieving the fragments. Hence, instead of invoking the powerful switch CPU, the NPU, which has limited computation capacity, is sufficient in processing the received Interest and retrieving the cached Content Object. In addition, the simplicity of sending previously generated communication frames (such as Ethernet frames) also means that the cached Content Object can be retrieved at a much faster rate compared to a scenario where a frame suitable for communication with the attached storage is generated only when cache retrieval is needed.

Figure 6:
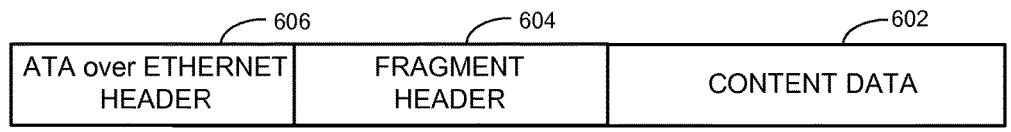
FIG. 6 presents a diagram illustrating an exemplary Content Object fragment retrieved from the attached storage, in accordance with an embodiment of the present invention.

Once those pre-assembled Ethernet frames are sent to the attached storage device, the control and management module of the storage device analyzes the received frames to obtain the LBA addresses included in the frames. Using the obtained LBA addresses, the control and management module can access the corresponding storage blocks to obtain the cached content. Note that each Ethernet frame can be used to retrieve a corresponding content fragment, which can occupy multiple contiguous storage blocks as specified by the LBA address. For ATA over Ethernet, a retrieved content packet can include the ATA over Ethernet header. FIG. 6 presents a diagram illustrating an exemplary Content Object fragment retrieved from the attached storage, in accordance with an embodiment of the present invention.

In FIG. 6, a retrieved Content Object fragment 600 includes a content data field 602, a fragment header 604, and an ATA over Ethernet header 606. Content data field 602 includes the content fragment. Fragment header 604 is similar to fragment header 504, and includes information associated with the fragmentation. ATA over Ethernet header 606 includes information associated with the Ethernet link, such as the Ethernet source and destination addresses, and ATA-specific fields, such as sector count and LBA addresses.

Figure 7:
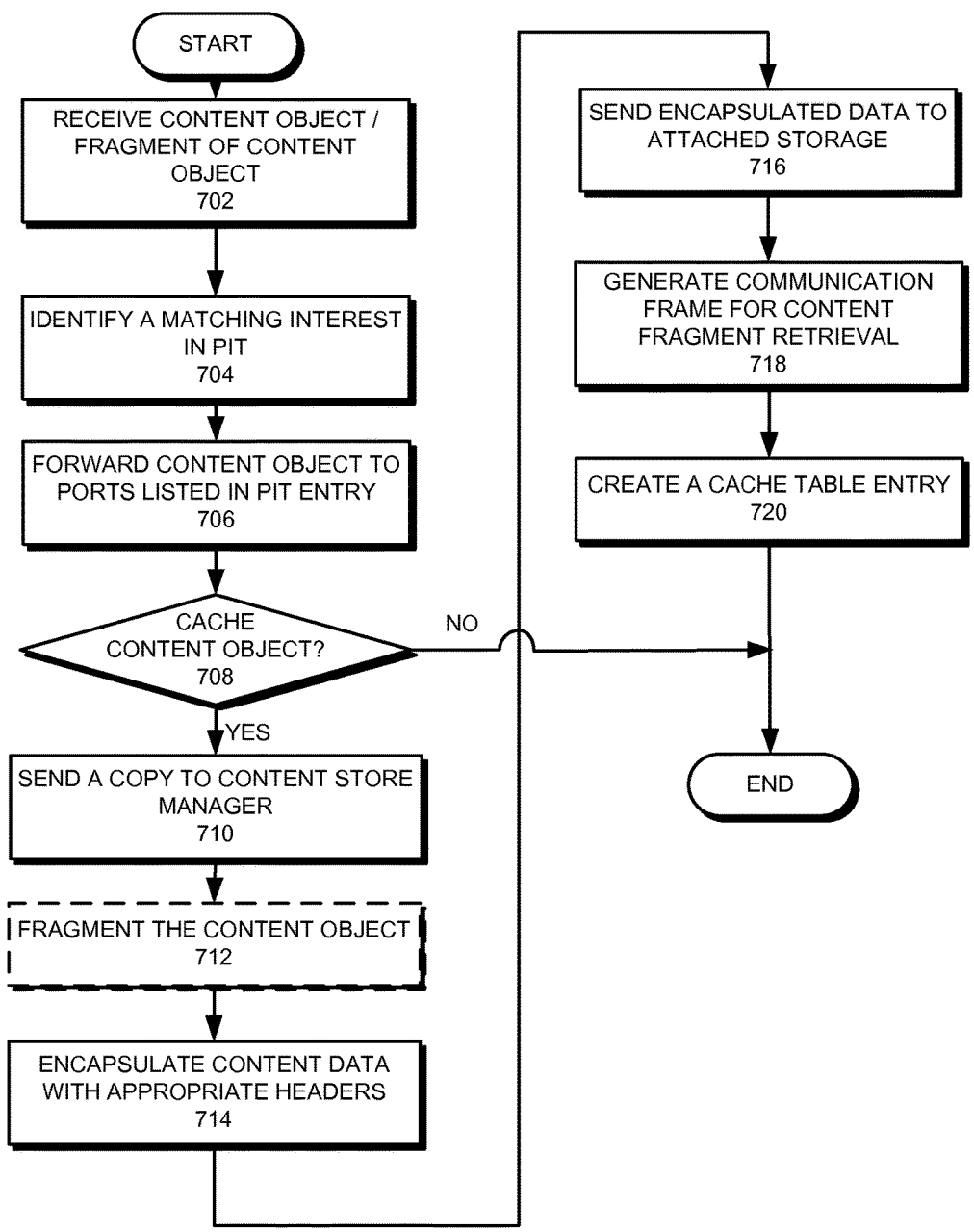
FIG. 7 presents a flowchart illustrating the process of caching a Content Object in an attached storage device, in accordance with an embodiment of the present invention.

FIG. 7 presents a flowchart illustrating the process of caching a Content Object to an attached storage device, in accordance with an embodiment of the present invention. During operation, an intermediate node (such as a switch or a router) coupled to an attached storage in a CCN receives a Content Object or fragments of the Content Object (operation 702). Note that the intermediate node can be a CCN-enabled switch that maintains the three major CCN data structures, the content store (CS), the pending Interest table (PIT), and the forwarding information base (FIB). In addition, the Content Object may have been fragmented by its originating node to ensure that no further fragmentation is needed along the path of the Content Object.

The intermediate node then identifies, based on the name or name prefix of the Content Object, a matching Interest in the PIT (operation 704), and forwards the Content Object to the one or more requesting ports (which are the incoming ports of the matching pending Interest) listed in the PIT entry (operation 706). In some embodiments, the PIT lookup and the Content Object forwarding are performed by a simple network-processing unit (NPU) at the line speed. The intermediate node also determines whether to cache the received Content Object (operation 708). In some embodiments, the NPU makes such decision based on the popularity or the importance level of the Content Object. In response to the NPU determining to cache the Content Object, the NPU sends a copy of the received Content Object to a content store (CS) manager (operation 710). In some embodiments, the Content Object is multi-casted to the requesting ports (as listed in the PIT) and the CS manager. In some embodiments, the CS manager can be a process running on the switch CPU or a standalone module. Upon receiving the Content Object or fragments of the Content Object, the CS manager may optionally fragment (or re-fragment if it receives fragments initially) the Content Object based on the MTU of the link between the intermediate node and the attached storage. For each fragment, the CS manager encapsulates the content data with appropriate transport and fragment headers (operation 714), and sends the encapsulated content data frame to the attached storage device (operation 716). Note that, to do so, the CS manager may need to determine the number of contiguous storage blocks needed for caching the content data frame. The appropriate headers may include the fragment headers (if the Content Object is fragmented) and the transport headers. Subsequently, the CS manager generates a communication frame that can later be used to retrieve the cached content fragment from the attached storage (operation 718). When all fragments of a Content Object have been cached, the CS manager creates an entry in a cache table (operation 720). The entry is indexed by the corresponding Interest (as indicated by the PIT entry). Alternatively, entries in the cache table can also be indexed by names of the cached Content Objects. Note that in a system using hash-based forwarding, the entries may be indexed by the similarity hash of the Interest. Note that the similarity hash is computed to uniquely identify a piece of content, and can be a hash of the name and one or more fields in the content packet. If the intermediate node includes multiple line cards capable of receiving Interests, the CS manager (which can be located at the supervisor card) will populate the cache table to all line cards, thus ensuring that the same cache table is checked for Interests received on any line card.

Figure 8:
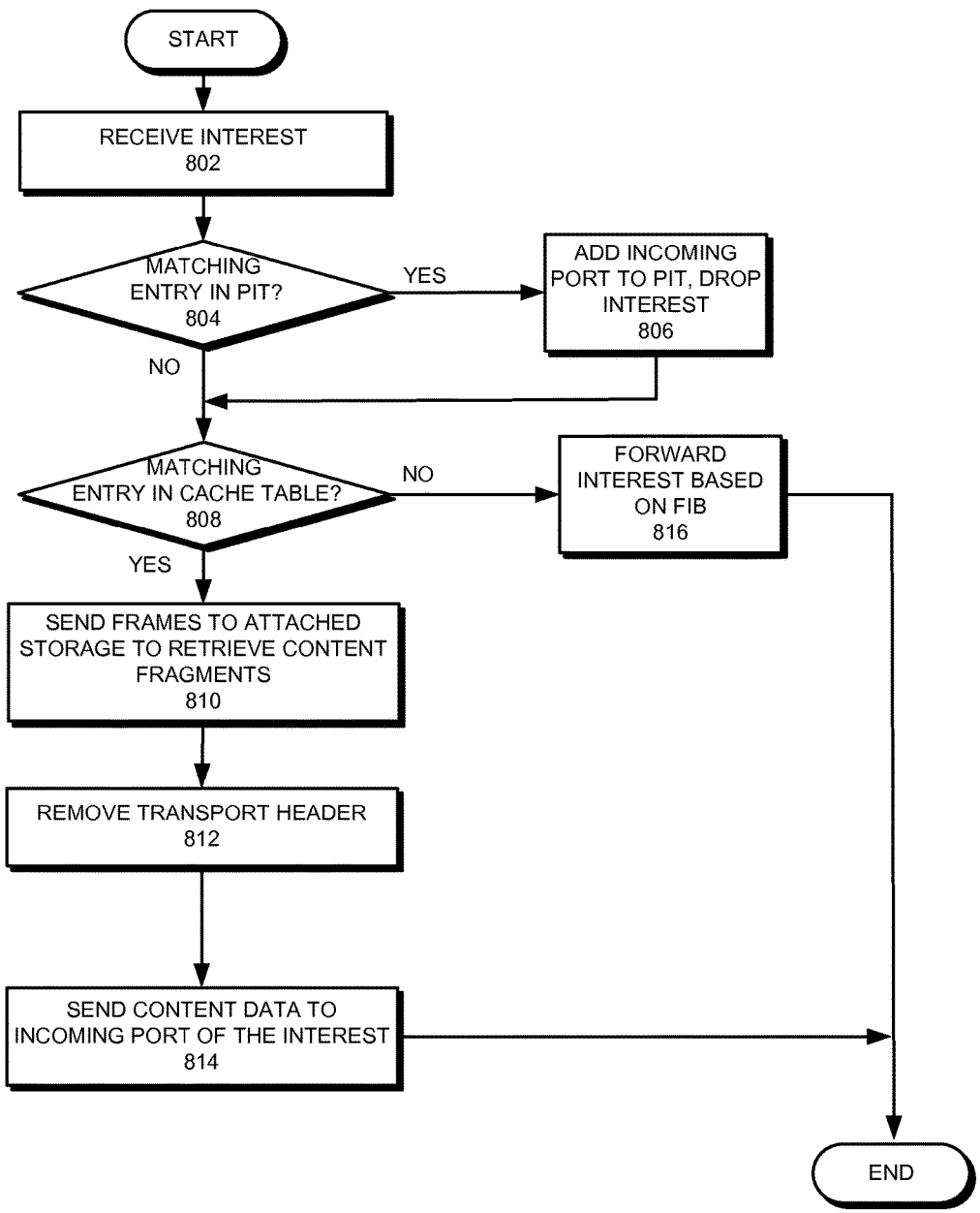
FIG. 8 presents a flowchart illustrating the process of retrieving a cached Content Object from an attached storage device, in accordance with an embodiment of the present invention.

FIG. 8 presents a flowchart illustrating the process of retrieving a cached Content Object from an attached storage device, in accordance with an embodiment of the present invention. During operation, a CCN-enabled switch receives an Interest (operation 802), and determines whether a matching entry exists in the PIT (operation 804). In some embodiments, the Interest may arrive on a media port located on a line card of the switch, and the operation of checking the PIT may be performed by a NPU included in the same line card. In further embodiments, checking the PIT may include perform a longest-match lookup based on a HSVLI associated with the Interest. If so, the NPU adds the port on which the Interest is received to the incoming port listed in the corresponding PIT entry (operation 806). If not, the NPU further checks the Content Store to determining whether a matching entry can be found in a cache table maintained at the Content Store (operation 808). In some embodiments, the cache table is stored in a fast memory, and different entries in the cache table represent different Content Objects stored in a storage attached to the CCN-enabled switch. The entries are indexed by names of Interests (HSVLIs or their hashes) that correspond to the Content Objects. A respect entry in the cache table includes a number of communication frames, each capable of retrieving a content fragment from the attached storage. In some embodiments, the attached storage is an ATA over Ethernet (AoE) storage or a Fibre Channel over Ethernet (FCoE) storage, and the communication frames are Ethernet frames.

If a matching entry is found in the cache table, the NPU sends all communication frames (which can be Ethernet frames) included in the matching entry to the attached storage to retrieve corresponding content fragments (operation 810). Note that, in some embodiments, the total number of frames included in each entry corresponds to the total number of fragments included in the Content Object. Once a content fragment is retrieved from the attached storage, the NPU removes the encapsulated transport headers, such as AoE or FCoE headers (operation 812), and sends the content data (optionally including the fragment header) to the incoming port of the Interest (operation 814). In some embodiments, the NPU may identify frames whose encapsulated transport headers should be removed based on whether the frame has a destination Ethernet address as the NPU and a source Ethernet as from a known storage system. Note that the payload of the received AoE or FCoE packets are properly formed CCN Content Object or Content Object fragment, no additional processing is necessary. If no matching entry is found in the cache table, the NPU will forward the Interest using information obtained from the FIB (operation 816).

Note that, in embodiments of the present invention, the queries or communication frames that can directly access storage blocks located on the attached storage are generated before the actual querying happens. Also note that in order to directly read from those storage blocks, the queries need to abide to certain appropriate format depending on the type of the attached storage. For AoE or FCoE storage, Ethernet headers are needed to encapsulate the ATA or Fibre Channel read command. Such an encapsulation can take time and delay the response to an incoming Interest. Hence, by pre-assembling (using a more powerful CPU) appropriate queries and caching those pre-assembled queries in a fast memory, embodiments of the present invention allow fast content retrieval. More specifically, a simple NPU, which has limited computation power and does not have a file system, can directly access the attached storage for retrieval of cached Content Object. Note that although computationally limited, the NPU is capable of performing simple operations of table lookup and frame forwarding at a much higher speed than the frame-assembling speed of a powerful CPU, thus ensuring a fast Interest response rate, which is desirable for CCNs.

Figure 9:
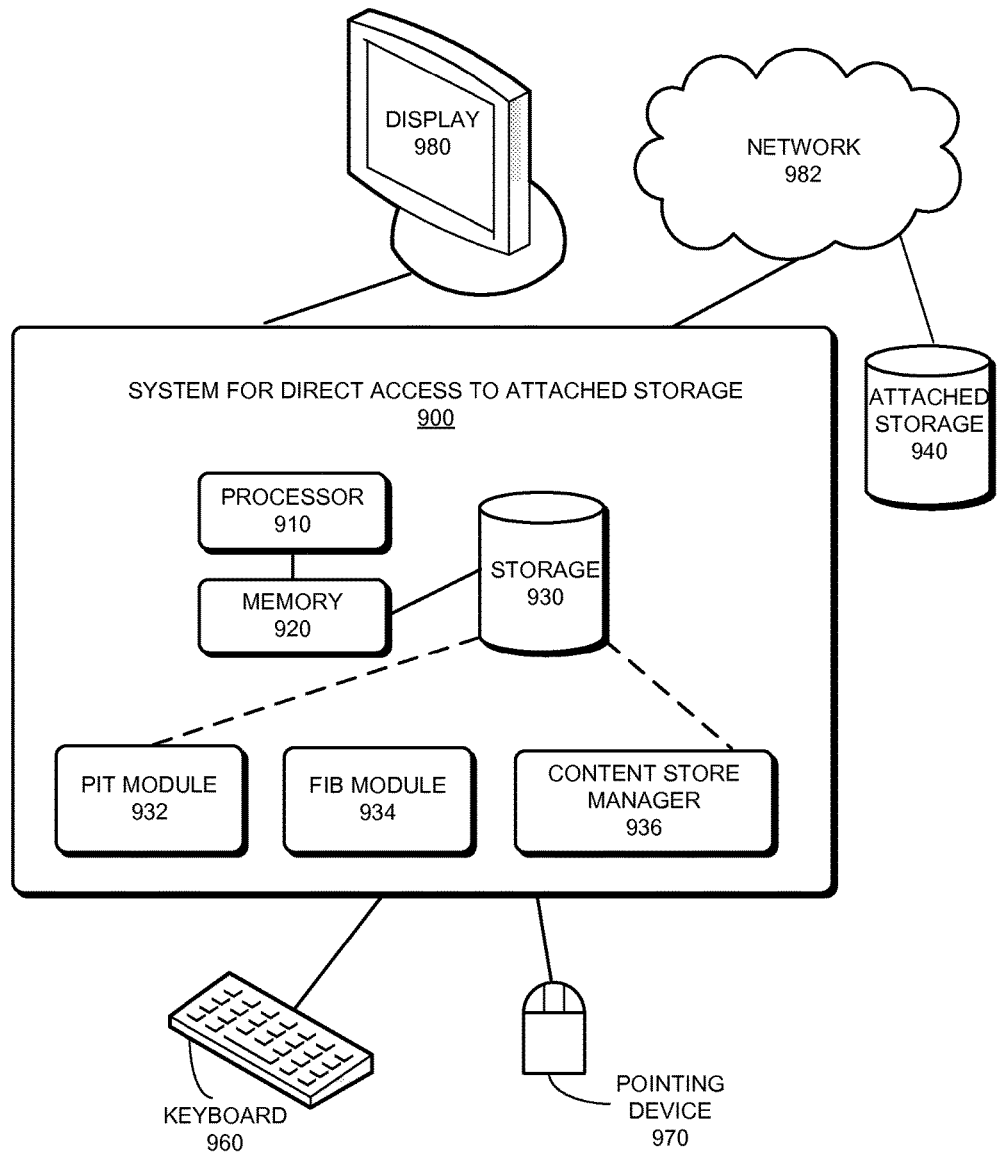
FIG. 9 illustrates an exemplary system for direct access to attached storage, in accordance with an embodiment.

FIG. 9 illustrates an exemplary system for direct access to attached storage, in accordance with an embodiment. A system 900 for direct access to attached storage comprises a processor 910, a memory 920, and a storage 930. Storage 930 typically stores instructions which can be loaded into memory 920 and executed by processor 910 to perform the methods mentioned above. In one embodiment, the instructions in storage 930 can implement a PIT module 932, a FIB module 934, and a content store manager 936, all of which can be in communication with each other through various means.

In some embodiments, the Content Store can be a compressed table that includes an index to the storage array's network address, a flag to indicate the type of encapsulation to construct, and the disk addresses to retrieve. The NPU constructs the appropriate network frame or frames when needed. This approach trades storage space in the CS for NPU processing cycles.

In some embodiments, modules 932, 934, and 936 can be partially or entirely implemented in hardware and can be part of processor 910. Further, in some embodiments, the system may not include a separate processor and memory. Instead, in addition to performing their specific tasks, modules 932, 934, and 936, either separately or in concert, may be part of general- or special-purpose computation engines.

Storage 930 stores programs to be executed by processor 910. Specifically, storage 930 stores a program that implements a system (application) for direct access to an attached storage, such as a network-attached storage 940. During operation, the application program can be loaded from storage 930 into memory 920 and executed by processor 910. As a result, system 900 can perform the functions described above. System 900 can be coupled to an optional display 980, keyboard 960, and pointing device 970, and also be coupled via one or more network interfaces to network 982.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A method for caching content data to a storage device attached to a switch in a content-centric network (CCN), the method comprising:
    receiving a first interest in a content packet, wherein the content packet includes a plurality of fragments;
    receiving, by the switch, the content packet;
    forwarding the content packet to an incoming port of the first interest in the content packet;
    caching a copy of the content packet in the attached storage device, wherein the attached storage device is coupled to the switch via a communication link, and wherein the copy of the content packet is stored in a set of storage blocks located in the attached storage device, wherein caching a copy of the content packet includes storing each fragment of the plurality of fragments into a separate set of contiguous storage blocks;
    assembling a query frame for retrieving content from at least one storage block, wherein the query frame includes an address of the attached storage device and an identifier of a storage block in the set of storage block, wherein a separate query frame is assembled for each fragment of the plurality of fragments of the content packet;
    storing a plurality of query frames corresponding to the plurality of fragments for the content packet in an entry of a cache table in the switch; and
    responsive to receiving an Interest for content of the content packet, retrieving the plurality of query frames from the cache and transmitting the plurality of query frames to the attached storage device to retrieve the content packet based on the identifier.

2. The method of claim 1, wherein the attached storage device includes at least one of:
    an advanced technology attachment (ATA) over Ethernet storage array;
    a Fibre Channel over Ethernet (FCoE) storage array; and
    an Internet Small Computer System Interface (iSCSI) storage array.

3. The method of claim 1, further comprising:
    searching the cache table to obtain an assembled query frame by performing a longest-prefix-match lookup based on the first interest.

4. The method of claim 1, wherein the switch includes multiple line cards each capable of receiving content and interest packets, and wherein the cache table is populated to all of the multiple line cards.

5. The method of claim 1, wherein storing comprises storing the query frame in an entry of the cache table that is indexed by the first interest.

6. The method of claim 1, wherein storing comprises storing the query frame in an entry of the cache table that is indexed by a name of a cached content object.

7. The method of claim 1, wherein storing comprises storing the query frame in an entry of the cache table indexed by a similarity hash of the first interest computed to uniquely identify a piece of content, based on a hash of a name and one or more fields in the content packet.

8. A system for caching content data to a storage device attached to a switch in a content-centric network (CCN), the system comprising:
    a memory storing executable instructions;
    a processor coupled to the memory and configured to execute the executable instructions which cause the processor to perform a method, the method comprising:
        receiving a first interest in a content packet, wherein the content packet includes a plurality of fragments;
        receiving, by the switch, the content packet;
        forwarding the content packet to an incoming port of the first interest in the content packet;
        caching a copy of the content packet in the attached storage device, wherein the attached storage device is coupled to the switch via a communication link, and wherein the copy of the content packet is stored in a set of storage blocks located in the attached storage device, wherein caching a copy of the content packet includes storing each fragment of the plurality of fragments into a separate set of contiguous storage blocks;
        assembling a query frame for retrieving content from at least one storage block, wherein the query frame includes an address of the attached storage device and an identifier of a storage block in the set of storage block, wherein a separate query frame is assembled for each fragment of the plurality of fragments of the content packet;

storing a plurality of query frames corresponding to the plurality of fragments for the content packet in an entry of a cache table in the switch; and responsive to receiving an Interest for content of the content packet, retrieving the plurality of query frames from the cache and transmitting the plurality of query frames to the attached storage device to retrieve the content packet based on the identifier.

9. The system of claim 8, wherein the attached storage device includes at least one of:

an advanced technology attachment (ATA) over Ethernet storage array;

a Fibre Channel over Ethernet (FCoE) storage array; and an Internet Small Computer System Interface (iSCSI) storage array.

10. The system of claim 8, wherein the processor is further configured to execute to instructions stored in the memory that cause the processor to search the cache table to obtain an assembled query frame by performing a longest-prefix-match lookup based on the first interest.

11. The system of claim 8, wherein the switch includes multiple line cards each capable of receiving content and interest packets, and wherein the processor is further to execute to instructions stored in the memory that cause the processor to populate the cache table to all of the multiple line cards.

12. The system of claim 8, wherein the processor is configured to execute instructions stored in the memory that cause the processor to store the query frame in an entry of the cache table indexed by a similarity hash of the first interest computed to uniquely identify a piece of content, based on a hash of a name and one or more fields in the content packet.

13. A non-transitory computer-readable storage medium storing instructions that when executed by a computer cause the computer to perform a method for caching content data to a storage device attached to a switch in a content-centric network (CCN), the method comprising:

receiving a first interest in a content packet, wherein the content packet includes a plurality of fragments;

receiving, by the switch, the content packet;

forwarding the content packet to an incoming port of the first interest in the content packet;

caching a copy of the content packet in the attached storage device, wherein the attached storage device is coupled to the switch via a communication link, and wherein the copy of the content packet is stored in a set of storage blocks located in the attached storage device, wherein caching a copy of the content packet includes storing each fragment of the plurality of fragments into a separate set of contiguous storage blocks;

assembling a query frame for retrieving content from at least one storage block, wherein the query frame includes an address of the attached storage device and an identifier of a storage block in the set of storage block, wherein a separate query frame is assembled for each fragment of the plurality of fragments of the content packet;

storing a plurality of query frames corresponding to the plurality of fragments for the content packet in an entry of a cache table in the switch; and responsive to receiving an Interest for content of the content packet, retrieving the plurality of query frames from the cache and transmitting the plurality of query frames to the attached storage device to retrieve the content packet based on the identifier.

14. The non-transitory computer-readable storage medium of claim 13, wherein the attached storage device includes at least one of:

an advanced technology attachment (ATA) over Ethernet storage array;

a Fibre Channel over Ethernet (FCoE) storage array; and an Internet Small Computer System Interface (iSCSI) storage array.

15. The non-transitory computer-readable storage medium of claim 13, wherein the method further comprises:

searching the cache table to obtain an assembled query frame by performing a longest-prefix-match lookup based on the first interest.

16. The non-transitory computer-readable storage medium of claim 13, wherein storing comprises storing the query frame in an entry of the cache table that is indexed by the first interest.

17. The non-transitory computer-readable storage medium of claim 13, wherein storing comprises storing the query frame in an entry of the cache table indexed by a similarity hash of the first interest computed to uniquely identify a piece of content, based on a hash of a name and one or more fields in the content packet.

18. The method of claim 1, wherein the query frame is an Ethernet frame comprising:

an Ethernet header having a media access control (MAC) address of the attached storage device; and a logical block address (LBA) of a storage block in the set of storage blocks.

19. The system of claim 8, wherein the query frame is an Ethernet frame comprising:

an Ethernet header having a media access control (MAC) address of the attached storage device; and a logical block address (LBA) of a storage block in the set of storage blocks.

20. The non-transitory computer-readable storage medium of claim 13, wherein the query frame is an Ethernet frame comprising:

an Ethernet header having a media access control (MAC) address of the attached storage device; and a logical block address (LB A) of a storage block in the set of storage blocks.

* * * * *